United States Patent
Jun

(10) Patent No.: US 6,593,993 B1
(45) Date of Patent: Jul. 15, 2003

(54) METHOD FOR FABRICATING LARGE SCALE LIQUID CRYSTAL DISPLAY DEVICE

(75) Inventor: Jae-Hong Jun, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 244 days.

(21) Appl. No.: 09/717,216

(22) Filed: Nov. 22, 2000

(30) Foreign Application Priority Data

Nov. 26, 1999 (KR) .......................................... 1999-53023

(51) Int. Cl.[7] ............................................. G02F 1/1339
(52) U.S. Cl. ........................ 349/187; 349/153; 349/155
(58) Field of Search ........................ 349/187, 73, 122, 349/106, 110, 155, 156, 157, 202

(56) References Cited

U.S. PATENT DOCUMENTS 6,181,405 B1 * 1/2001 Izumi .......................... 349/153

6,437,847 B1 * 8/2002 Kishimoto ................... 349/106

* cited by examiner

Primary Examiner—Toan Ton
Assistant Examiner—P. R. Akkapeddi
(74) Attorney, Agent, or Firm—McKenna Long & Aldridge LLP

(57) ABSTRACT

A liquid crystal display device having a first substrate and a plurality of smaller second substrates. A plurality of color filters that are separated by black matrix elements are on the first substrate. A transparent conductive electrode is over the color filters. A supporting rib is located on the transparent conductive electrode. A first orientation film covers the transparent conductive electrode and the supporting rib. Sealant is located along the edges of the first substrate. The second substrates are attached to the first substrate via the sealants such that the supporting rib supports and spaces the second substrates.

25 Claims, 5 Drawing Sheets

METHOD FOR FABRICATING LARGE SCALE LIQUID CRYSTAL DISPLAY DEVICE

This application claims the benefit of Korean Patent Application No. 1999-53023, filed on Nov. 26, 1999, which is hereby incorporated by reference for all purposes as if fully set forth herein.

BACKGROUND OF THE INVENTION

1. Field of the Invention

The present invention relates to a liquid crystal display (LCD) device, and more particularly, to a large-scale liquid crystal display device having a color filter.

2. Discussion of the Related Art

A liquid crystal display device conventionally includes both display and pad portions. The pad portion includes driving circuits that transmit signals to the display portion. The display portion then displays images. The display portion includes upper and lower substrates with a liquid crystal interposed therebetween.

FIG. 1 shows a liquid crystal panel 10 of a typical color LCD device. As shown, upper and lower substrates 12 and 18 oppose each other and a liquid crystal 20 is interposed therebetween. On the upper substrate 12 are a color filter 14 and a transparent common electrode 16. The lower substrate 18, often called an array substrate, includes a plurality of switching devices 22 and a plurality of pixels 24. The size of each pixel 24 relates to the resolution of the liquid crystal display device, while the size of the liquid crystal display device itself depends both on the size and on the number of the pixels 24.

On the lower substrate 18 are a plurality of gate lines 26 and data lines 28 that are arranged in a matrix fashion. A pixel area is defined by adjacent gate and data lines. In each pixel 24 is a pixel electrode 30 that is comprised of a transparent conductive material. Between the pixel electrodes and the common electrode 16 is the liquid crystal 20. The switching devices 22, positioned near cross points of the gate and data lines 26 and 28 in each pixel 24, selectively apply an electric voltage across the electrodes. The switching devices 22 are usually thin film transistors (TFTs).

As shown in FIG. 2, gate driving circuits 42 and data driving circuits 44 are positioned adjacent the liquid crystal panels 10 of TFT LCD devices 40. The gate driving circuits 42 transmit scanning signals to the gate lines 26 (see FIG. 1), while the data driving circuits 44 transmit data signals to the data lines 28 (see FIG. 1).

The above-described liquid crystal display device beneficially has a large display area. Conventionally, to make a large liquid crystal display multiple small-sized array substrates are independently fabricated and interconnected. FIGS. 3, 4A, 4B, and 5 illustrate a conventional method for fabricating large liquid crystal display devices.

As shown in FIG. 3, a first liquid crystal panel 56 includes upper and lower substrates 50 and 52 that are attached to each other via sealants 54, while a second liquid crystal panel 64 also includes upper and lower substrates 58 and 60 that are attached to each other via sealants 62.

The liquid crystal panels 56 and 64 are then cut down the center axes of the sealants 54 and 62, respectively. FIG. 4A shows the liquid crystal panels 56 and 64 after cutting. In the liquid crystal panels 56 and 64, halves of the sealants 54a and 62a, respectively, remain. For the sake of convenience, only one sealant of each panel is shown as being cut. However, two or four surfaces of the liquid crystal panels are usually cut in an actual fabrication process.

Next, as shown in FIG. 4B, the liquid crystal panels 56 and 64 are attached to each other via a black sealant 68 such that the cut surfaces of the sealants 54a and 62a oppose each other. The upper substrates 50 and 58 then make an enlarged display area.

Finally, as shown in FIG. 5, upper and lower supporting substrates 74 and 76 that have sizes that correspond to those of the enlarged upper and lower substrates 70 and 72 are, respectively, attached to outer surfaces of the enlarged upper and lower substrates 70 and 72. This completes the large-scale liquid crystal display device 80. Though two supporting substrates 74 and 76 are shown as supporting the enlarged substrates 70 and 72, the actual number of supporting substrates are not necessarily fixed.

In the conventional large-scale liquid crystal display device, to prevent light leakage through gaps that might form between the attached sealants 54a and 62a (see FIG. 4B) a sufficiently large black matrix should cover the attached sealants. This decreases the aperture ratio of the completed liquid crystal display device. Furthermore, since each of the liquid crystal panels is independent, there is a lack of display uniformity. Finally, additional parts, such as the supporting substrates, are required.

SUMMARY OF THE INVENTION

Accordingly, the principles of the present invention are directed to a method for fabricating large scale liquid crystal display devices that substantially obviates one or more of the limitations and disadvantages of the related art.

An object of the present invention is to simplify the fabricating process of large-scale liquid crystal display devices.

It is another object of the present invention to stabilize the cell gaps of large-scale liquid crystal display devices.

Additional features and advantages of the invention will be set forth in the description that follows, and in part will be apparent from that description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a fabricating method that includes preparing a first substrate and a plurality of second substrates that are smaller than the first substrate; forming a switching device on each of the second substrates; forming a plurality of spaced apart black matrices on the first substrate; forming a plurality of color filters on the first substrate, each color filter being surrounded by black matrices; forming a transparent conductive electrode on the color filters; forming a supporting rib on the transparent conductive electrode; forming a first orientation film over the first substrate such that the first orientation film covers the transparent conductive electrode and the supporting rib; locating sealants on edges of the first substrate such that the sealants surround the first orientation film; forming a second orientation film on each of the second substrates such that the second orientation film covers the switching device; and attaching the second substrates to the first substrate via the sealants such that the supporting rib supports the second substrates such that the second substrates are separated by a constant cell spacing.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF ILLUSTRATED EMBODIMENTS

Reference will now be made in detail to the illustrated embodiments of the present invention, examples of which are shown in the accompanying drawings.

Figure 6:
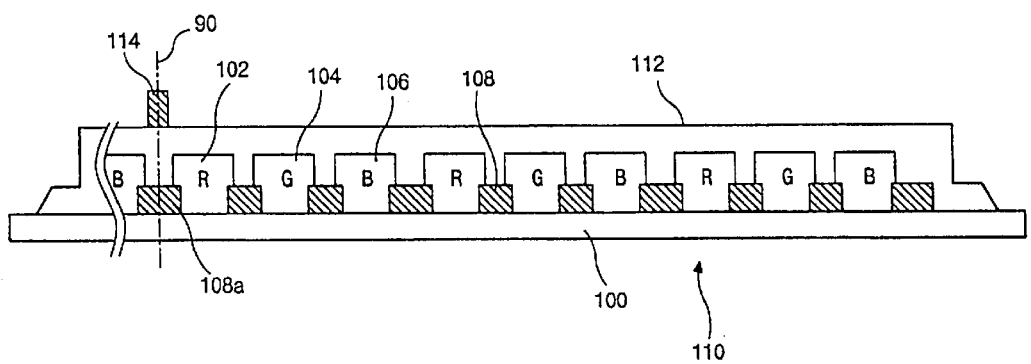
FIGS. 6 to 8 illustrate a method for fabricating a large-scale liquid crystal display device according to the principles of the present invention.

FIG. 6 illustrates a color filter lower substrate 110 for a large-scale liquid crystal display device. As shown, a large (40 inch) substrate 100 is provided for a plurality of red, green, and blue color resins (color filters) 102, 104, and 106, respectively, that are sequentially arranged on the substrate 100. A black matrix 108 is positioned in gaps between the color resins. A common electrode 112 comprised of a transparent conductive metal such as indium tin oxide (ITO) is located over the color resins and the black matrix. On the common electrode 112, at a position corresponding to a centerline 90 of the color filter substrate 100, is a supporting rib 114. That rib will be used to maintain a constant cell gap between the color filter substrate 100 and array substrates 120 and 122 (see FIG. 8) that are subsequently attached. The supporting rib 114 is preferably comprised of a black resin polymer.

As shown, the width of the supporting rib 114 is beneficially smaller than that of the black matrix 108. Further, when the supporting rib 114 is attached along the centerline 90 of the common electrode 112 the supporting rib aligns with a black matrix 108a such that the supporting rib 114 does not extend beyond the area defined by the black matrix 108a. Though only one supporting rib 114 is employed in the illustrated embodiment, the number, location, and features of the supporting ribs can vary, provided the supporting rib or ribs maintain stable cell gaps. Beneficially, the supporting rib or ribs should not exceed the area defined by the black matrix 108.

Figure 7:
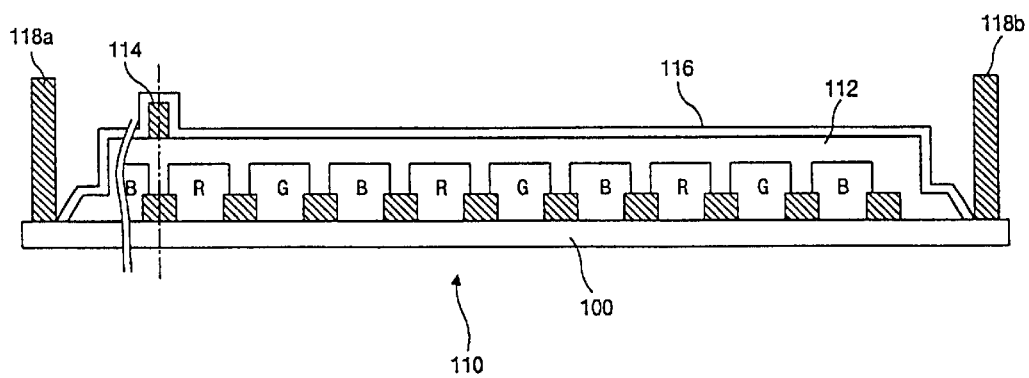

Referring now to FIG. 7, a first orientation film 116 comprised of a polymer, such as polyimide, is deposited on the common electrode 112 and over the supporting rib 114. Sealants 118a and 118b are then coated on edges of the color filter substrate 100. In some applications the sealants 118a and 118b are actually one continuous sealant.

Figure 8:
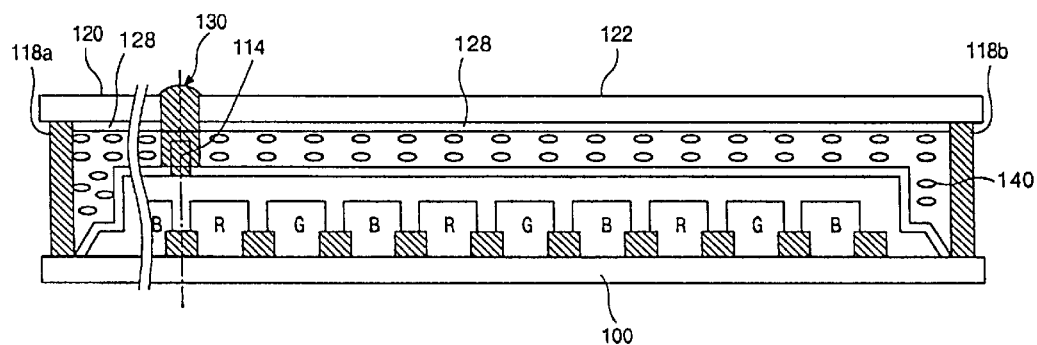

Next, as shown in FIG. 8, first and second array substrates 120 and 122 are attached to the color filter substrate 100 via the sealants 118a and 118b. Each of the array substrates 120 and 122 includes a second orientation film 128 on a surface that is opposed to the color filter substrate 100. To attach the first and second substrates 120 and 122 together, an ultra violet hardener 130 is injected into a gap between the first and second array substrates 120 and 122 using a dispenser (not shown). The ultra violet hardener 130 is then hardened via ultra violet rays.

A liquid crystal 140 is then injected into the space between the array substrates 120 and 122 and the color filter substrate 100. The display is then sealed such that the liquid crystal does not leak.

Figure 9:
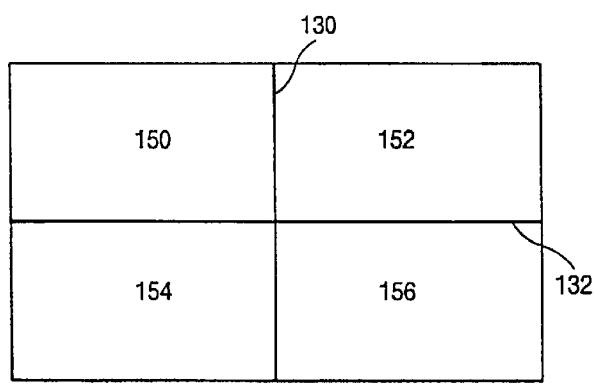
FIG. 9 is a conceptual plan view of a modification of the embodiment of FIGS. 6 to 8.
Figure 10:
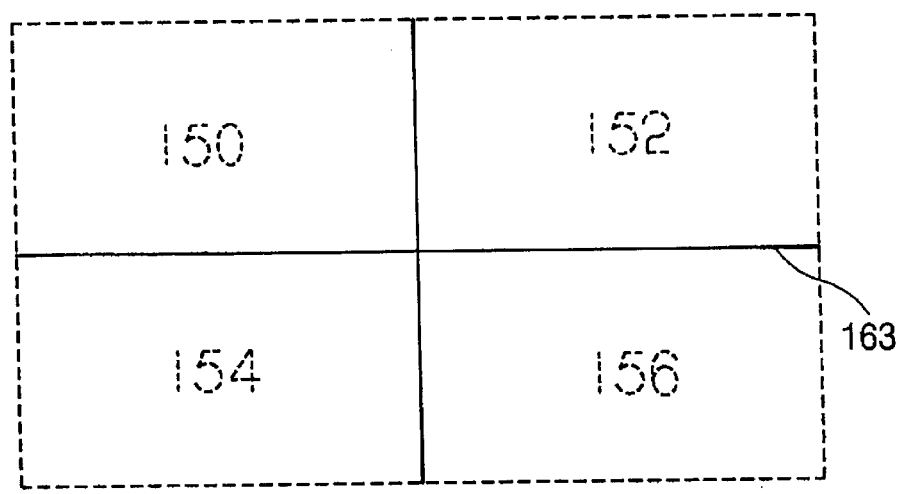
FIG. 10 is a plan view of a supporting rib used in the modification of FIG. 9.

In the above-described embodiment, only two array substrates are used. However, the number of array substrates is not limited to two. For example, FIG. 9 shows four smaller array substrates 150, 152, 154, and 156. In FIG. 9, the supporting rib should have a cross shape. FIG. 10 shows an isolation view of a cross-shaped supporting rib 163. Additionally, besides the ultra violet hardener 130, an additional ultra violet hardener 132 should be used to attach the four array substrates 150, 152, 154, and 156.

Figure 1:
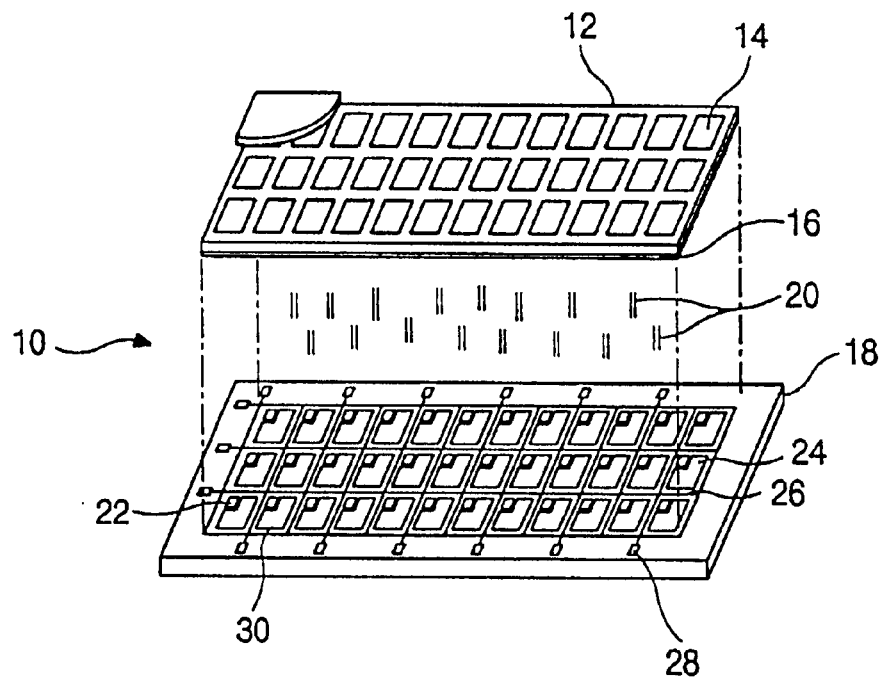
FIG. 1 illustrates a configuration of a liquid crystal panel.
Figure 2:
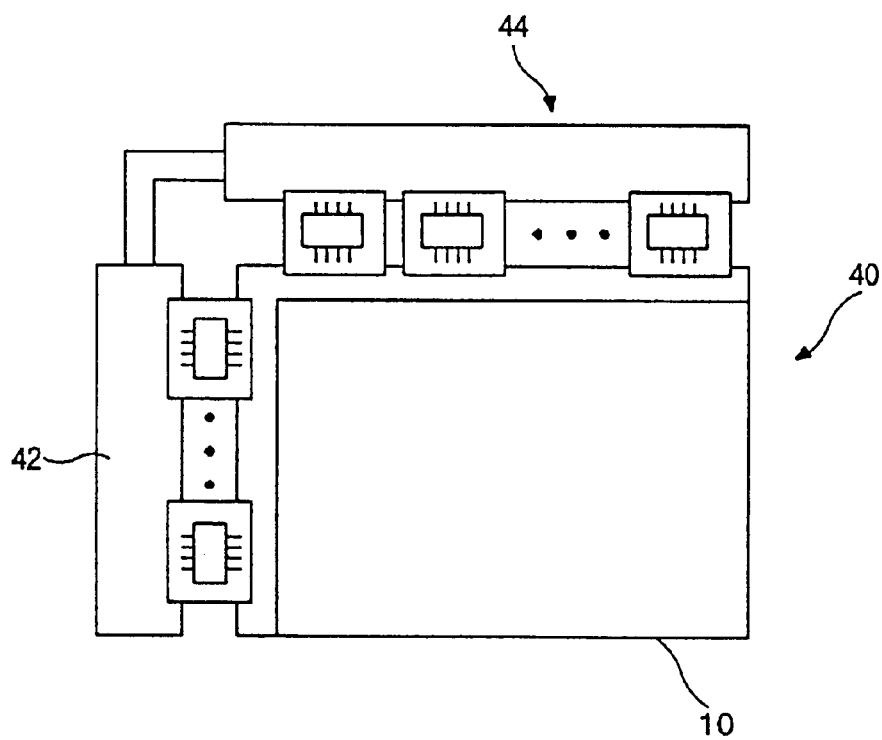
FIG. 2 is a conceptual plan view of a liquid crystal display device.
Figure 3:
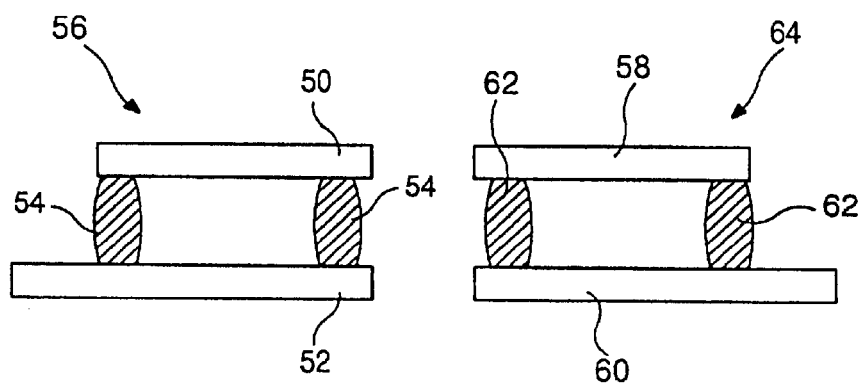
FIGS. 3, 4A, 4B, and 5 illustrate a conventional method for fabricating a large-scale liquid crystal display device.
Figure 4A:
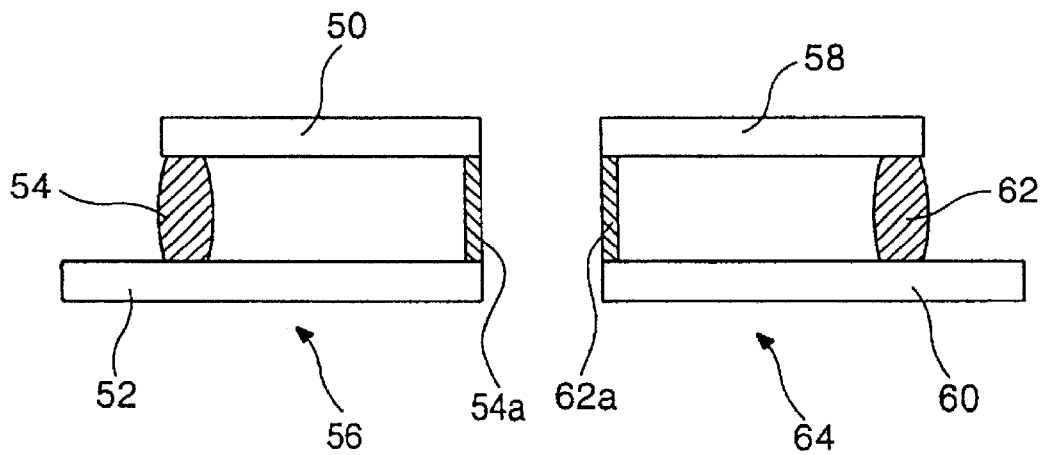
Figure 4B:
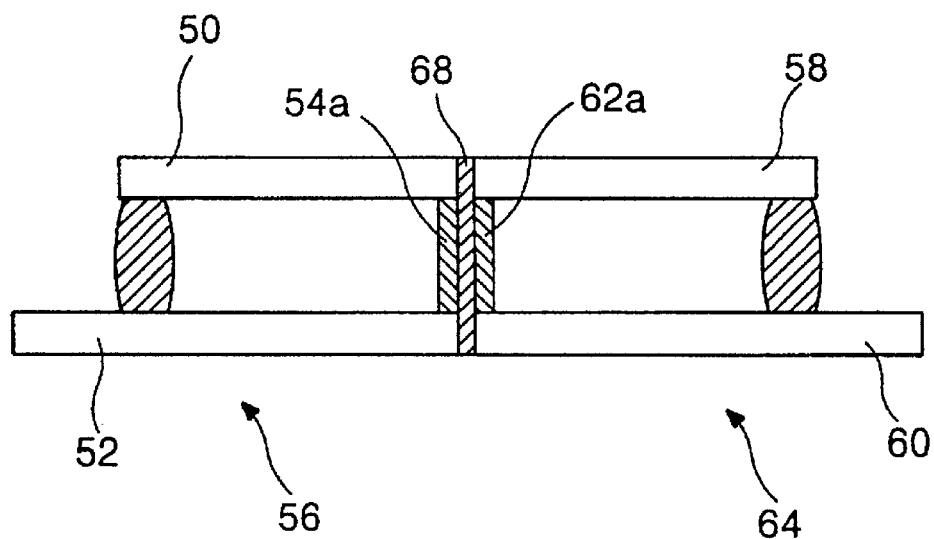
Figure 5:
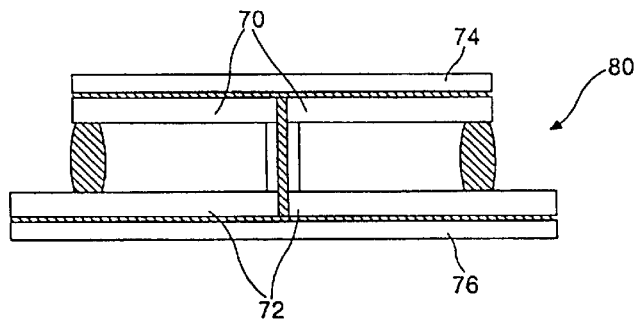

In the foregoing large-scale liquid crystal display device, there is no need for processes such as attaching the supporting substrates 74 and 76 as shown in FIG. 5. The cell gaps are uniformly maintained by the supporting rib 114. Further, since there is no cut sealants 54a and 62a as shown in FIG. 4B, the width of the black matrix can be reduced and the aperture ratio increased.

It will be apparent to those skilled in the art that various modifications and variation can be made in the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display device, comprising:

forming a plurality of color filters and spaced apart black matrices on a first substrate such that each color filter is surrounded by black matrices;

forming a transparent conductive electrode on the color filters;

forming a supporting rib on the transparent conductive electrode;

forming a first orientation film over the transparent conductive electrode and over the supporting rib;

forming sealants along edges of the first substrate such that the sealants surround the first orientation film;

preparing a plurality of second substrates that are smaller than the first substrate;

forming a second orientation film on each of the second substrates; and attaching the plurality of second substrates to the first substrate using the sealant and the supporting rib such that the supporting rib spaces and provides a supporting boundary between the plurality of second substrates.

2. The fabricating method according to claim 1, wherein the supporting rib is formed in alignment with a black matrix.

3. The fabricating method according to claim 1, further including injecting resin between the second substrates.

4. The fabricating method according to claim 3, further wherein the injected resin is ultra violet light curable.

5. The fabricating method according to claim 4, further including irradiating the resin with ultra violet light.

6. The fabricating method according to claim 1, further including injecting liquid crystal between the first substrate and the second substrates.

7. The fabricating method according to claim 2, wherein the supporting rib is formed along a center line of the first substrate.

8. The fabricating method according to claim 7, wherein the supporting rib is formed narrower than the black matrix it is aligned with.

9. The fabricating method according to claim 1, wherein the second substrate includes a switching device.

10. The fabricating method according to claim 9, wherein the switching device includes a thin film transistor.

11. A liquid crystal display device, comprising:

a first substrate having a transparent conductive electrode;

a plurality of second substrates spaced apart from and attached to the first substrate;

a supporting rib on said transparent conductive electrode, said supporting rib disposed at a position where at least two boundaries of said plurality of second substrates converge, wherein said supporting rib spaces and provides a supporting boundary between the plurality of second substrates; and a liquid crystal interposed between the first substrate and the plurality of the second substrates.

12. A liquid crystal display device according to claim 11, wherein each of said second substrates is smaller than the first substrate.

13. A liquid crystal display device according to claim 11, wherein said first substrate includes a plurality of color filters.

14. A liquid crystal display device according to claim 13, wherein said first substrate further includes a plurality of black matrix elements that are disposed between said plurality of color filters.

15. A liquid crystal display device according to claim 14, further including an orientation layer over said supporting rib and over said transparent conductive electrode.

16. A liquid crystal display device according to claim 11, further including a switching device on the first substrate.

17. A liquid crystal display device according to claim 16, wherein the switching device is a thin film transistor.

18. A liquid crystal display device according to claim 14, further including sealants on said first substrate, said sealants for producing spacing and attaching said plurality of second substrates to said first substrate.

19. A liquid crystal display device according to claim 11, wherein said supporting rib is cross-shaped.

20. A liquid crystal display device according to claim 11, wherein said supporting rib is black.

21. A liquid crystal display device according to claim 11, wherein said first substrate includes a centerline, and wherein said supporting rib is aligned with said center line.

22. A liquid crystal display device according to claim 14, wherein said first substrate includes a center line, wherein said supporting rib is aligned with said center line, and wherein said supporting rib is aligned with a first black matrix element of said plurality of black matrix elements.

23. A liquid crystal display device according to claim 11, further including a resin over said supporting rib and between said plurality of second substrates.

24. A liquid crystal display device according to claim 23, wherein said resin is curable by ultraviolet light.

25. The fabricating method according to claim 5, further including capping the supporting rib with the resin irradiated by ultra violet light.

* * * * *